R. B. DISBROW.
MILKING APPARATUS.
APPLICATION FILED MAY 21, 1917.

1,308,051.

Patented July 1, 1919.
2 SHEETS—SHEET 1.

Witnesses
A. H. Opsahl
E. C. Wells

Inventor
REUBEN B. DISBROW
By his Attorneys
Williamson Merchant

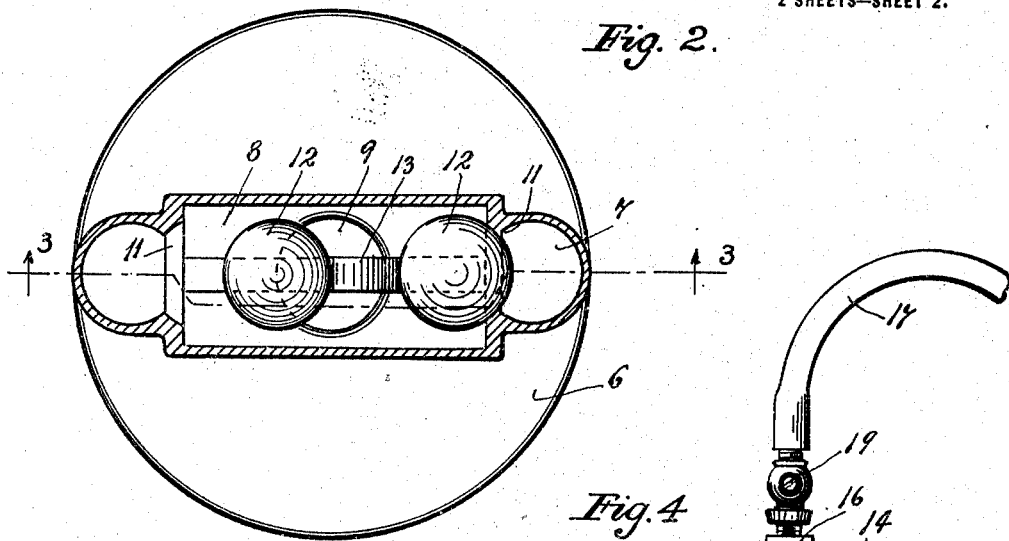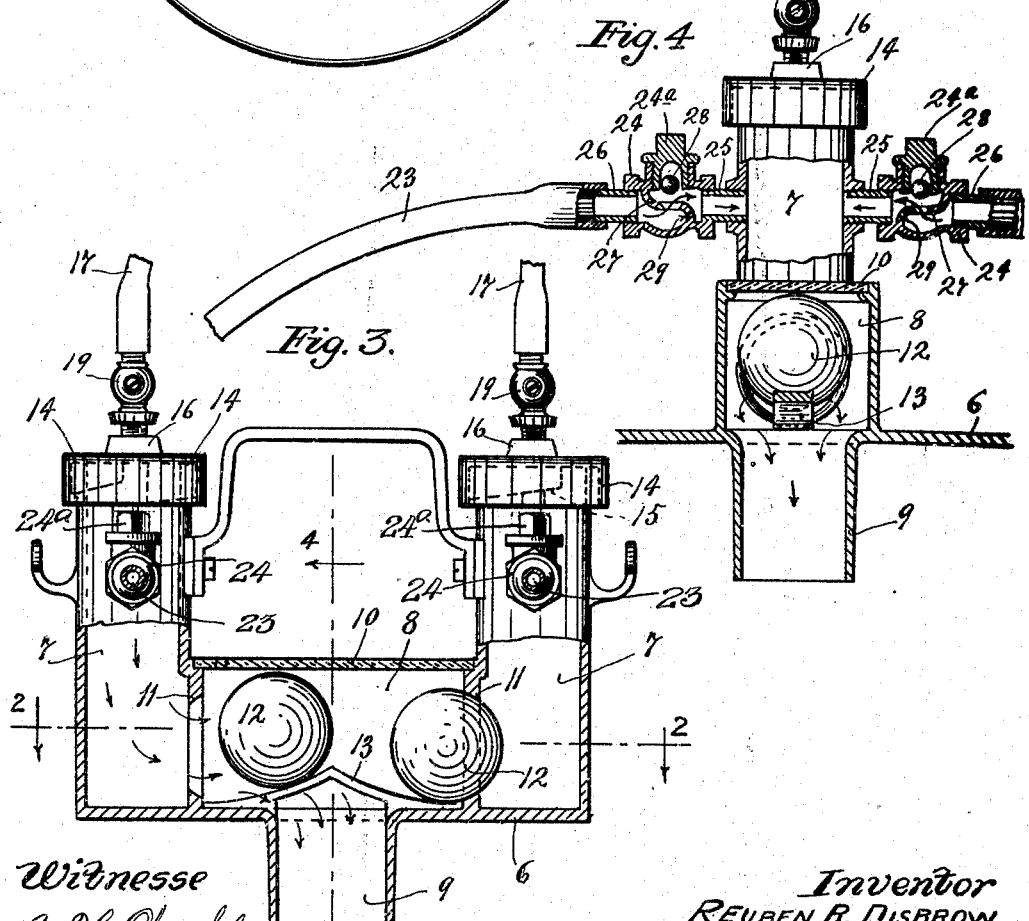

UNITED STATES PATENT OFFICE.

REUBEN B. DISBROW, OF ST. PAUL, MINNESOTA.

MILKING APPARATUS.

1,308,051.  Specification of Letters Patent.  Patented July 1, 1919.

Application filed May 21, 1917. Serial No. 169,914.

*To all whom it may concern:*

Be it known that I, REUBEN B. DISBROW, a citizen of the United States, residing at St. Paul, in the county of Ramsey and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus, and has for its object to improve the construction and operation of the same in the several particulars hereinafter noted; and to such ends, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 2 is a plan view of the milk can and mechanism applied to the top or lid thereof, some parts being sectioned on the line 2—2 of Fig. 3;

Fig. 3 is a vertical section taken through the cover structure on the line 3—3 of Fig. 2; and Fig. 4 is a vertical section on the line 4—4 of Fig. 3, some parts being shown in full.

Figure 1:
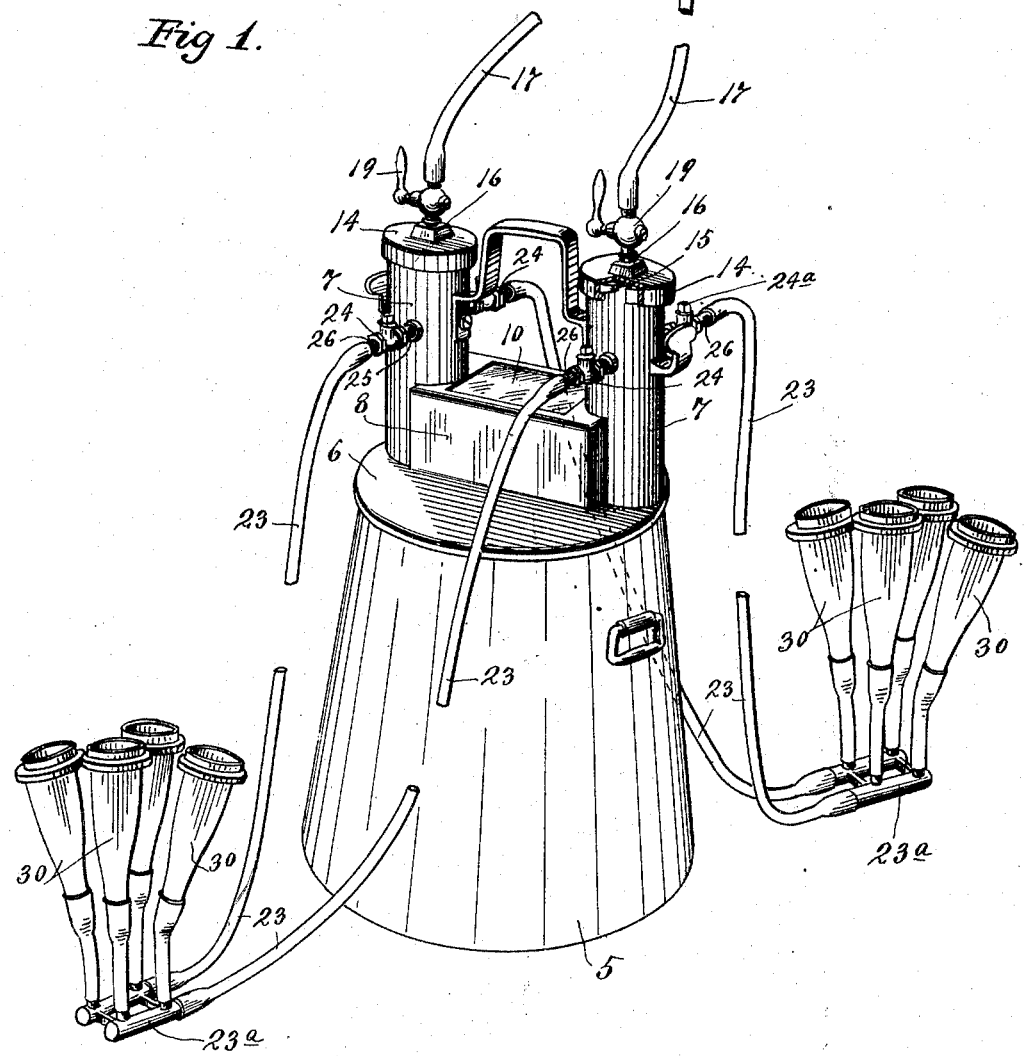
Figure 1 is a perspective view illustrating the improved milking apparatus, some parts being broken away.

In this type of milking apparatus, the vacuum chamber and valves coöperating therewith are applied directly on the cover, and the teat-cups are connected to these so-called vacuum chambers. Partial vacuum is produced in these so-called vacuum chambers by a pulsating device preferably consisting of coöperating cylinders and pistons.

The milk can or receptacle 5 has a detachable cover 6 which need not fit the same tightly, but may rest loosely thereon. This cover 6 affords the base for upright so-called vacuum chambers 7, the walls of which are shown as cast integral with the said top. These vacuum chambers 7 at their lower extremities merge into a common chamber 8 that has a discharge tube 9 that depends into the can 5. The chamber 8 is shown as provided with a glass top plate 10 through which the operation of the valve mechanism within the same may be observed. This plate 10 will preferably be made removable so that the apparatus may be more readily cleaned. At points where the vacuum chambers 7 open into the common chamber 8, they are provided with valve-seated partitions 11 that are normally engaged by check valves 12, preferably of the rubber ball type. These valves 8 rest upon an oblique rail or runway 13 that bridges the upper portion of the discharge tube 9 without closing or choking the same. Normally, these ball valves 12 will run down the rail 13 and be seated in the partitions 11, thereby closing the passages therethrough and preventing flow of air or other fluid in a direction from chamber 8 into said chamber 7.

The vacuum chambers 7 at their upper extremities 11 are shown as provided with caps or heads 14 applied thereto with liquid tight joints and preferably made readily detachable by interlocking cam acting bayonet joints 15 of well known construction. These caps 14 are provided with metallic nipples or tube extensions 16 that are connected to flexible pulsator tubes 17, and, as shown, are equipped with normally open cutoff valves 19. The pulsator tubes 17 are connected to the opposite piston chambers of a double ended cylinder 20 in which pistons 21 are arranged to work. These pistons 21 have projecting rods 22 which, in practice, will be connected for simultaneous reciprocatory movements so that they will produce in the two cylinders and, hence, in the two pulsator tubes 17 and two vacuum chambers 7, suction or partial vacuum in reverse or alternate order.

A milk tube is connected to each vacuum chamber 7 and, as shown, each such milk tube comprises a flexible hose 23, a valve casing 24, and short metal tubes 25 and 26. The tube 25 connects the valve casing to its respective vacuum chamber 7, and the tube 26 connects the said valve casing to the delivery end of the respective flexible hose 23. In the preferred arrangement, each vacuum chamber 7 is provided with the said milk tube connections in duplicate, as best shown in Figs. 1 and 4. The valve casings 24 are shown as provided with partitions 27 formed with valve seats that are normally closed by ball valves 28. These ball valves 28, in Fig. 4 are shown as raised by suction or partial vacuum, and as then being confined within the cavities of detachable plugs 24$^a$ that are screwed into the tops of the said valve casings 24. These check valves 28 perform important functions, but in the use thereof, some normal communication between the chambers on the opposite sides of the partitions 27 should be provided. This may be done in a good many different ways as, for example, by providing said partitions each with one or more air passages 29 that are small in air conducting capacity as compared with the valve seats controlled by the check valves 28. The important purpose of this relation of parts will be presently noted.

The teat-cups of which there are preferably two groups of four each, are indicated as entireties by the numeral 30. Of each group of four teat-cups, two are connected to one of the tubes from one of the vacuum chambers 7, and the other two are connected to one of the tubes from the other of said vacuum chambers 7. As shown, the said milk tubes 23 at their free ends are provided with tubular metallic heads 23ᵃ that are tied together in pairs, and to which the said teat-cups are directly connected in the manner above stated.

It has hitherto been the practice to use milking apparatus of the general character herein disclosed but with valveless milk tubes or conduits through which both the vacuum producing and the pressure or relief pulsations from the pulsating device operate instantly and in an unrestricted manner. In practice, I have found that the suction or partial vacuum producing action on the teat-cups may be produced instantly, and with good results, but that the relief from said partial vacuum should be somewhat slower or restricted. Check valves in the milk tubes will accomplish this result when used in connection with a restricted relief passage or what might be designated as, or likened to a leaky check valve such as the arrangement described. With this described arrangement, when the partial vacuum is produced in one of the chambers 7, check valves 28 will freely open and the milk drawing action will be substantially the same as if the said check valves were not present. When, however, the said vacuum chamber is relieved from partial vacuum, the effect does not instantly take place in the teat-cups, but is rendered slow, since the air for such relief must pass through the restricted or relatively small air passages 29. This gives the desired retarded relief from partial vacuum or suction, and very materially reduces the tendency of the teat-cups to drop from position. In this way, the teat-cups are entirely relieved from an action usually present in apparatus of this general character, due to a sort of a blowing or air compression action produced by the pulsator, especially when the latter is in the form of a cylinder and piston where positive rush of air is produced. Moreover, the restriction of the air passage between the vacuum chambers and milk tubes produced by the check valves 28 when closed, causes the air when forced into the vacuum chambers 7, not only to relieve the vacuum therein, but to actually produce an air pressure above that of atmospheric pressure which positively forces the valves 12 into open positions, and positively discharges the milk into the milk can. As already stated, the said check valves 12 will be seated and under partial vacuum or suction in the vacuum chambers 7, will be tightly closed and will prevent reverse flow of air or milk from chamber 8 back into either of the said chambers 7.

What I claim is:

1. In a milking apparatus, the combination with two vacuum chambers connected by a common chamber and having valve seats that open into said common chamber, said common chamber having a depending discharge passage and ball supporting rails, of ball check valves mounted on said rails and arranged to be gravity seated to normally close said valve seats, milk tubes independently connected to said vacuum chambers, and means for producing suction pulsations in said two vacuum chambers.

2. In a milking apparatus, the combination with two vacuum chambers connected by a common chamber and having valve seats that open into said common chamber, said common chamber having a depending discharge passage and ball supporting rails, of ball check valves mounted on said rails and arranged to be gravity seated to normally close said valve seats, milk tubes independently connected to said vacuum chambers, and means for producing suction pulsations in said two vacuum chambers in alternate order, the said milk delivery tubes having check valves interposed therein and arranged to open under partial vacuum in their respective vacuum chambers.

In testimony whereof I affix my signature in presence of two witnesses.

REUBEN B. DISBROW.

Witnesses:
CLARA DEMAREST,
MAY A. SMITH.

Copies of this patent may be obtained for five cents each, by addressing the "Commissioner of Patents, Washington, D. C."